US006466785B1

(12) United States Patent
Chambert et al.

(10) Patent No.: US 6,466,785 B1
(45) Date of Patent: Oct. 15, 2002

(54) METHOD AND APPARATUS IN A COMMUNICATION NETWORK

(75) Inventors: Georg Chambert, Uppsala (SE); Johan Rune, Lidingö (SE)

(73) Assignee: Telefonaktiebolget LM Ericsson (publ) (SE)

( * ) Notice: Subject to any disclaimer, the term of this patent is extended or adjusted under 35 U.S.C. 154(b) by 0 days.

(21) Appl. No.: 09/309,350

(22) Filed: May 11, 1999

(30) Foreign Application Priority Data

May 11, 1998 (SE) .............................................. 9801630

(51) Int. Cl.⁷ .................................................. H04Q 7/20
(52) U.S. Cl. ........................ 455/422; 455/435; 455/552
(58) Field of Search ................................ 455/422, 432, 455/433, 435, 436, 466, 456, 458; 370/328, 444, 445, 552

(56) References Cited

U.S. PATENT DOCUMENTS 5,590,398 A  12/1996  Matthews ................... 455/33.1
5,610,974 A  * 3/1997  Lantto ......................... 455/433

FOREIGN PATENT DOCUMENTS

WO   WO 94/13114   6/1994
WO   WO 95/08902   3/1995
WO   WO 96/34504   10/1996

* cited by examiner

Primary Examiner—Nay Maung
(74) Attorney, Agent, or Firm—Jenkens & Gilchrist

(57) ABSTRACT

The present invention relates to a method and an apparatus for providing each terminal ($t_1$, $t_2$, t) in a network (n) with an adapted location area ($HA_{t1}$, $HA_{t2}$, $FA_s$, $FA_{pt}$), customised to the long term or short term historical movements or behaviour of the terminal ($t_1$, $t_2$, t) in the network (n). The terminal ($t_1$, $t_2$, t) can enter three different modes; session mode, packet mode and transaction mode, which controls what kind of location area ($HA_{t1}$, $HA_{t2}$, $FA_s$, $FA_{pt}$) the terminal ($t_1$, $t_2$, t) should use. The types of location areas are a home location area ($HA_{t1}$, $HA_{t2}$), based on the long term historical movements of the terminal ($t_1$, $t_2$, t) and used when the terminal ($t_1$, $t_2$, t) is located inside a home area constituting the normal mobility pattern of the terminal in the network (n), a session mode-fast adaptive location area ($FA_s$), used when the terminal ($t_1$, $t_2$, t) enters the session mode and is located outside the home area, and a packet mode/transaction mode-fast adaptive location area ($FA_{pt}$), used for burstlike traffic when the terminal ($t_1$, $t_2$, t) enters the packet mode or the transaction mode.

52 Claims, 6 Drawing Sheets

METHOD AND APPARATUS IN A COMMUNICATION NETWORK

TECHNICAL FIELD OF THE INVENTION

The present invention relates to a method and an apparatus in a communication network for customising a location area for each radio mobile terminal in the network by continuously adapting the size and the shape of the location area to that particular behaviour of the terminal in the network.

DESCRIPTION OF RELATED ART

According to prior art a communication network, also called network or cellular network, has to keep track of the movements of a radio mobile terminal, also called terminal or mobile terminal, to be able to reach the terminal for incoming traffic to the terminal.

This means that when the terminal changes its location in the network it has to inform the network of its new location. This is normally known as location updating or location registration. A location area is defined as an area in which the terminal is able to move around without informing the network of its location. This reduces the number of location updates performed by the terminal as the terminal only has to inform the network when the terminal changes location area.

The larger the location areas are, the fewer location updates are required by the terminal, but more base stations within the location area are involved when the terminal is paged in the network, and vice versa.

The network for example does paging of a terminal in the network when incoming calls to the terminal are to be set-up, whereby the terminal is paged in all cells belonging to the current location area of the terminal.

Periodic registration, also called periodic location updating, is a way for the network to keep track of if a terminal is leaving the coverage area of the network, or to keep track of if a terminal is shut down from the network without informing the network of this. Hereby, the network avoids to page terminals, which are not able to receive the page. Terminals in the network informs the network of their position at predetermined time intervals, even if the terminal has not changed location area and hence the network gets a confirmation of that the terminal still is reachable in the network.

Generally, information that is sent between the terminal and a corresponding basestation in the network comprise circuit switched traffic, like traditional phone calls, and packet data traffic consisting of information in packets.

A location area used for packet data traffic is smaller than a location area used for circuit switched traffic as packet information more generally are sent often and in bursts, a small amount information every time. More location updates are performed by the terminal in the network as the location areas are small but the radio resources consumed by paging decreases with smaller location areas, since fewer basestations take part in the page.

Existing networks today use location areas, which are static and the same for every terminal in the network. These location areas have fixed shapes and sizes, which are fairly adapted to fit an average behaviour of a user of a terminal in the network.

More advanced networks use overlapping location areas, for example in the mobile system PDC, which results in that different terminals in the network use different location areas. Still the overlapping location areas have fixed shapes and sizes.

A problem with this method is that the size of a location area will inevitably be a compromise between the needs of the different terminals in the network.

On research level adaptive methods are used that customise a location area for a specific terminal. Many of them define the location area as a list of cell identities.

A problem with this method is that a lot of data is transferred over the radio interface when the location area definitions are transferred from the network to the terminal.

In another method the cells are assumed to be equal in size and organised in a regular grid pattern. The size of the location area is defined as the number of cells the terminal can traverse before it has to perform a location update in the network.

A problem with this method is that the cells are assumed to be equal in size and organised in a regular grid pattern, which can not be assumed in a real network.

In the patent document WO 94/13114 is disclosed a method for performing location updating in a cellular radio system, wherein a location area is described which is dynamically adaptive and specific for each subscriber station.

A problem with this solution is that only the system is able to calculate location areas for the terminals in the network, wherein needed information must be transferred from the system to the subscriber station every time the location area for a terminal is changed.

Another problem is that multiple location area identities must be broadcasted in every cell by the system, which is a waste of radio resources in the system.

Further, the terminal is not used for collecting statistics or data, wherein the accuracy in the statistics, on which the adaptive location areas are based, may not be so good.

Another problem is that different location areas depending on the type of traffic sent between the terminals and the system or depending on in which area of the network the terminals are located is not used in this method, wherein the method is ineffective and not so flexible.

The patent document U.S. Pat. No. 5,590,398 describes a virtual mobile location area (VMLA) personalised to the habits of a terminal, which location area employs predetermined: grouping of cells arranged in order of likelihood that the terminal will be in the grouping. The historical pattern of the terminal is analysed and superimposed on the existing network to determine an optimum location area for the particular terminal.

A problem with this solution is that only the system is able to calculate location areas for the terminals in the network, wherein needed information must be transferred from the system to the terminal every time the location area for a terminal is changed.

A location update is performed when the terminal reaches a border of a location area, not at every contact between the network and the terminal, which results in that a contact with the network has to be done by the terminal with the only purpose to perform a location update.

Further, the terminal is not used for collecting statistics or data, wherein the accuracy in the statistics, on which the calculations of the location areas are based, may not be so good.

Another problem is that different location areas, depending on the type of traffic sent between the terminals and the system or depending on in which area of the network the terminals are located, is not used in this method, wherein the method is ineffective and not so flexible.

In the patent document WO 95/08902 is disclosed a method of registering a terminal in a cellular system in which cells form registration areas. Individual location areas are formed for one or more terminals with the intention of avoiding an unnecessarily high number of registrations in border areas of the different registration areas. The location area for a given. terminal has the form of a list of registration identities which list is transmitted to the terminal in conjunction with registration.

A problem with this solution is that the transferring of lists results in that a lot of data has to be sent at every registration, which in turn consumes valuable radio resources.

Another problem is that only the system is able to calculate location areas, wherein needed information must be transferred every time a location area is changed.

Further, different location areas depending on the type of traffic sent between the terminals and the system is not used in this method, wherein the method is ineffective and not so flexible.

SUMMARY OF THE INVENTION

The problem dealt with by the present invention is to minimise the radio resource consumption caused by paging, location updating and periodic registration of a radio mobile terminal, also called terminal or mobile terminal, in a communication network, also called network or cellular network.

Another problem is to distribute the load caused by location updating of the terminal in the network more evenly between cells in the network.

One intention of the invention is thus to minimise the radio resource consumption caused by paging, location updating and periodic registration of a terminal in the network.

Another intention is to distribute the load caused by location updating more evenly between cells in the network.

The problem is solved essentially by providing each terminal in a network with an adapted location area, customised to the long term or the short term historical movements or behaviour of the terminal in the network. The invention adapts algorithms, which controls the shape, the position and the size of the location area, wherein the location area continuously adapts to the behaviour of the user of the terminal.

More specifically, the problem is solved in the following manner.

The terminal and the network use three different kinds of modes according to the invention. These modes in turn control what kind of location area the terminal should use. The different modes are called session mode, packet mode and transaction mode.

For a specific terminal in the network, the network uses a mode corresponding to the same type of mode as used by the specific terminal.

The duration of the active periods of a communication, also called traffic, sent between the terminal and the corresponding basestation in the network and the duration of the silent periods in between the active periods determines according to the invention what type of mode the terminal and the network should be in.

Three main types of location areas are used according to the invention. The first type of location area is a home location area, which constitute the normal mobility pattern of the terminal in the network.

Algorithms based on the long term historical movements and traffic frequency of the terminal calculates, also called creates below, a home location area for the terminal when the terminal logs on to the network, and this location area is thereafter transferred from the terminal to the network.

The calculated home location area is used by the terminal and the network when the terminal and the network are in the session mode and when the terminal is located within an home area, which constitute the normal mobility pattern of the terminal in the network (i.e. the home location area).

The second type of location area used by the invention is a session mode-fast adaptive location area. Algorithms simultaneously in both the terminal and the network calculate this location area when the terminal and the network enter the session mode and when the terminal is located outside the home area of the terminal (i.e. the latest calculated home location area).

The third type is a fast adaptive location area, which is used for burstlike traffic, like packet data traffic, which area is called a packet mode/transaction mode-fast adaptive location area.

The terminal and the network use the packet mode/transaction mode-fast adaptive location area when the terminal and the network are in the packet mode or the transaction mode, irrespective of where the terminal is located in the network. Algorithms simultaneously in both the terminal and the network calculate the packet mode/transaction mode-fast adaptive location area for the terminal.

The terminal and the network changes dynamically between the three different modes and adapts themselves to the present type of traffic, which as described above determines what type of location area the terminal should use in the network.

One advantage afforded by the invention is that it proposes a location area scheme, which minimises the consumption of radio resources caused by paging, location updating and periodic registration of the terminal in the network.

Another advantage is that the method according to the invention is very flexible and adaptable. The method can dynamically adapt to a variety of users as well as to future changes in communication styles and network usage habits without compromising the efficient usage of radio resources.

Still another advantage is that, since the location area borders can coincide with arbitrary cell borders, the location update load will not be concentrated to a few cells at the border of the location areas as is the case when fixed location areas are used.

Yet another advantage is that, in most cases, the location area can be changed without exchanging any data between the terminal and the network. This is a very radio resource efficient location update.

Still another advantage is that the method according to the invention simultaneously accommodates the different aspects and requirements of circuit switched traffic and packet data traffic. Users of both these basic communication modes will be efficiently handled according to the invention.

Yet another advantage is that no manual configuration is required to create, maintain and modify the location areas. The method is fully automated in that respect.

The invention will now be described in more detail with reference to exemplifying embodiments thereof and also with reference to the accompany drawings.

DETAILED DESCRIPTION OF THE EMBODIMENTS

Figure 1:
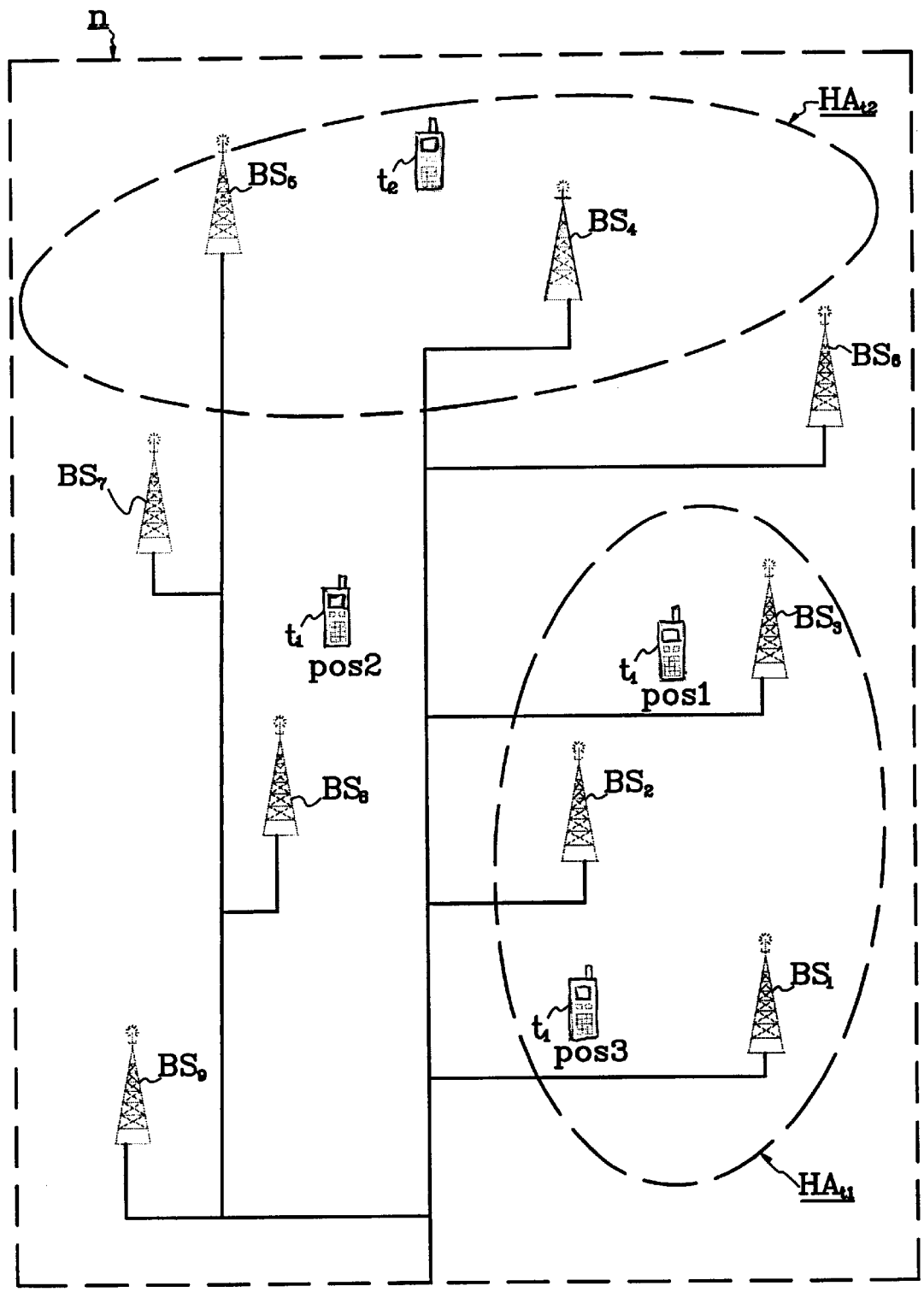
FIG. 1 illustrates a schematic view of a communication network comprising different terminals and basestations, according to the invention.

FIG. 1 shows a schematic view of a communication network n, also called network or cellular network, like for example GSM, NMT, and AMPS.

A number of basestations ($BS_1$–$BS_9$) are connected to the network n.

A first terminal $t_1$, also called terminal or mobile terminal, and a second terminal $t_2$ as shown in FIG. 1 can be used for communication in the network n. More terminals can exist in the network n than the two terminals $t_1$, $t_2$ shown in the figure.

In a first position pos1 shown in the figure the first terminal $t_1$ is located within a first home location area $HA_{t1}$ adapted to the first terminal $t_1$ according to the invention in the network n, which is described in more detail below.

In the same way the first terminal $t_1$ is located in a first fast adaptive location area respective a second fast adaptive location area when the first terminal $t_1$ is in a second position pos2 respective a third position pos3 in the network n, which is described in more detail below.

In this example the second terminal $t_2$ is located within a second home location area $HA_{t2}$ in the network n, as shown in FIG. 1.

Home location areas and fast adaptive location areas, adapted to a terminal $t_1$, $t_2$, are together called location areas below.

The network n is for example a universal network (GRAN, Generic Radio Access Network) described below, but the invention can be generalised to work in other networks too.

A universal network (GRAN, Generic Radio Access Network) is a network with a generic interface to which any type of service network (e.g. GSM, ISDN, PSTN) can connect. Users of the terminals subscribe to services in their respective service networks. The service networks use generic bearer services, offered by the universal network, to connect their users to the generic bearer services, thereby extending the ranges of their networks and providing mobility to their users.

This kind of universal network is described in Steinar Dahlin's patent application SE 9501497-3.

According to the invention each terminal $t_1$, $t_2$ and the network n can be in either of three different modes: session mode, packet mode and transaction mode. The duration of the active periods of a communication, also called traffic, between the terminal $t_1$, $t_2$ and the corresponding basestation $BS_1$–$BS_9$ in the network n and the duration of the silent periods in between the active periods determines what type of mode the terminal $t_1$, $t_2$ and the network n should use.

Two different ways of triggering a change of mode in the terminal $t_1$, $t_2$ respective in the network n are thereby used according to the invention. One way is to measure the duration of an active period in a communication and another way is to measure the duration of a silent period in between two active periods in a communication, as mentioned above.

Types of traffic are for example circuit switched traffic, like traditional phone calls, and packet data traffic consisting of information in. packets. Packet. data traffic could be packet oriented, transaction oriented and session oriented.

Packet data traffic with packet oriented behaviour, also called packet oriented traffic, is in turn consisting of a single packet. Packet data traffic with transaction oriented behaviour, also called transaction oriented traffic, consists of several packets (e.g. constituting a client-server request-response transaction) and packet data traffic with session oriented behaviour, also called session oriented traffic, consists of a complete application session.

Circuit switched traffic is often communication consisting of long lasting active periods and long lasting silent periods in between the active periods, but it is theoretically possible for circuit switched traffic to consist of very short active periods too.

Packet oriented traffic is most likely to consist of very short lasting active periods and very short lasting silent periods in between the active periods.

Transaction oriented traffic often consists of a little longer lasting active periods than the active periods for the packet oriented traffic, also called medium lasting active periods, with medium lasting silent periods in between the active periods. Session oriented traffic in turn consists often of long lasting active periods.

The terminal $t_1$, $t_2$ and the network n enter the session mode when the communication between the terminal $t_1$, $t_2$ and the corresponding basestation $BS_1$–$BS_9$ in the network n consists of a long lasting active period. As an example the active period should have a time length>=20 seconds.

The terminal $t_1$, $t_2$ and the network n enter the packet mode when the communication consists of a very short lasting. active period. As an example the active period should have a time length<=2.5 seconds.

When packet oriented communication is used, the packet mode is usually triggered in the terminal $t_1$, $t_2$ and in the network n, as this type of communication often consists of very short lasting active periods.

The terminal $t_1$, $t_2$ and the network n enter the transaction mode when the communication consists of a medium lasting active period with a time length within a specified window length. As an example the window length should be between 2.5 to 20 seconds.

When transaction oriented communication is used, the transaction mode is usually triggered in the terminal $t_1$, $t_2$ and in the network n, as this type of communication often consists of medium lasting active periods.

The duration of a silent period is used to trigger a change of mode in the terminal $t_1$, $t_2$ and in the network n when the current mode of the terminal $t_1$, $t_2$ and the network n is not suitable for the current type of traffic existing between the terminal $t_1$, $t_2$ and the network n.

In the packet mode, the communication between the terminal $t_1$, $t_2$ and the corresponding basestation $BS_1$–$BS_9$ in the network n is expected to consist of very short lasting active periods separated by very short lasting silent periods. If a too long duration of a silent period is detected in such a communication the packet mode is no longer suitable to use for the terminal $t_1$, $t_2$ and the network n. A too long duration of a silent period in this case is a duration exceeding a certain threshold value $T_p$.

In this case the terminal $t_1$, $t_2$ and the network n enter the transaction mode. The transaction mode is entered as the absence of packets in the communication between the terminal $t_1$, $t_2$ and the network n implies that the packets may have constituted a transaction, which is now finished, and therefore it is assumed that the current passive period is an interval between two transactions.

In the transaction mode, the communication between the terminal $t_1$, $t_2$ and the corresponding basestation $BS_1$–$BS_9$ in the network n is expected to consist of medium lasting active periods separated by medium lasting silent periods. If a too long duration of a silent period is detected in such a communication the transaction mode is no longer suitable to use for the terminal $t_1$, $t_2$ and the network n. A too long duration of a silent period in this case is a duration exceeding a certain threshold value $T_t$.

In this case the terminal $t_1$, $t_2$ and the network n enter the session mode. The session mode is entered as it is assumed that the transaction was part of a session, which is now finished, and therefore it is assumed that the current passive period is an interval between two sessions.

A terminal $t_1$, $t_2$ and a network n, currently in the packet mode, can enter the session mode in case this mode seems more suitable to use depending on the duration of a silent period and the historical statistics of the silent periods in the communication between the terminal $t_1$, $t_2$ and the network n.

Three main types of location areas are used according to the invention, which location areas are adapted to the behaviour of the terminal $t_1$, $t_2$. The first type of location area is a home location area $HA_{t1}$, $HA_{t2}$. The second type is a session mode-fast adaptive location area $FA_s$, and the third type is a packet mode/transaction mode-fast adaptive location area $FA_{pt}$.

The home location area concept of the invention is based on the assumption that most users of the terminals $t_1$, $t_2$ have a fairly regular mobility pattern i.e. the users travel often between certain places. The home location area $HA_{t1}$, $HA_{t2}$ is an area which constitute the normal mobility pattern of the terminal $t_1$, $t_2$ in the network n. This area is based on the long term historical movements of the terminal $t_1$, $t_2$, for example the past 100 days.

The invention uses a home location area $HA_{t1}$, $HA_{t2}$ customised to the terminal $t_1$, $t_2$ when the terminal $t_1$, $t_2$ and the network n use the session mode and when the terminal $t_1$, $t_2$ is located within the area which constitute the normal mobility pattern of the terminal $t_1$, $t_2$ in the network n. The creation of the home location area $HA_{t1}$, $HA_{t2}$ is based on long term statistics, also called data, of the terminal $t_1$, $t_2$ which statistics are collected by the terminal $t_1$, $t_2$ and stored in the terminal $t_1$, $t_2$. Examples of long term statistics of the terminal are incoming call frequency, outgoing call frequency, duration time per cell, and registered cell border crossings of the terminal $t_1$, $t_2$.

The creation of the home location area $HA_{t1}$, $HA_{t2}$ is done in the terminal $t_1$, $t_2$ at each initial registration when the terminal $t_1$, $t_2$ logs on to the network n. This can be when the terminal $t_1$, $t_2$ is turned on or when it enters the coverage area of the network n. The definition of the home location area $HA_{t1}$, $HA_{t2}$ is then transferred from the terminal $t_1$, $t_2$ to the network n.

If the terminal $t_1$, $t_2$ remains logged on to the network n for a very long time, it is also possible to let the terminal $t_1$, $t_2$ periodically calculate a new home location area and transfer the definition of the new home location area to the network n. The creation of a home location area $HA_{t1}$, $HA_{t2}$ according to the invention, adapted to the normal mobility pattern of the terminal $t_1$, $t_2$, is described below in association with FIG. 2.

Figure 2:
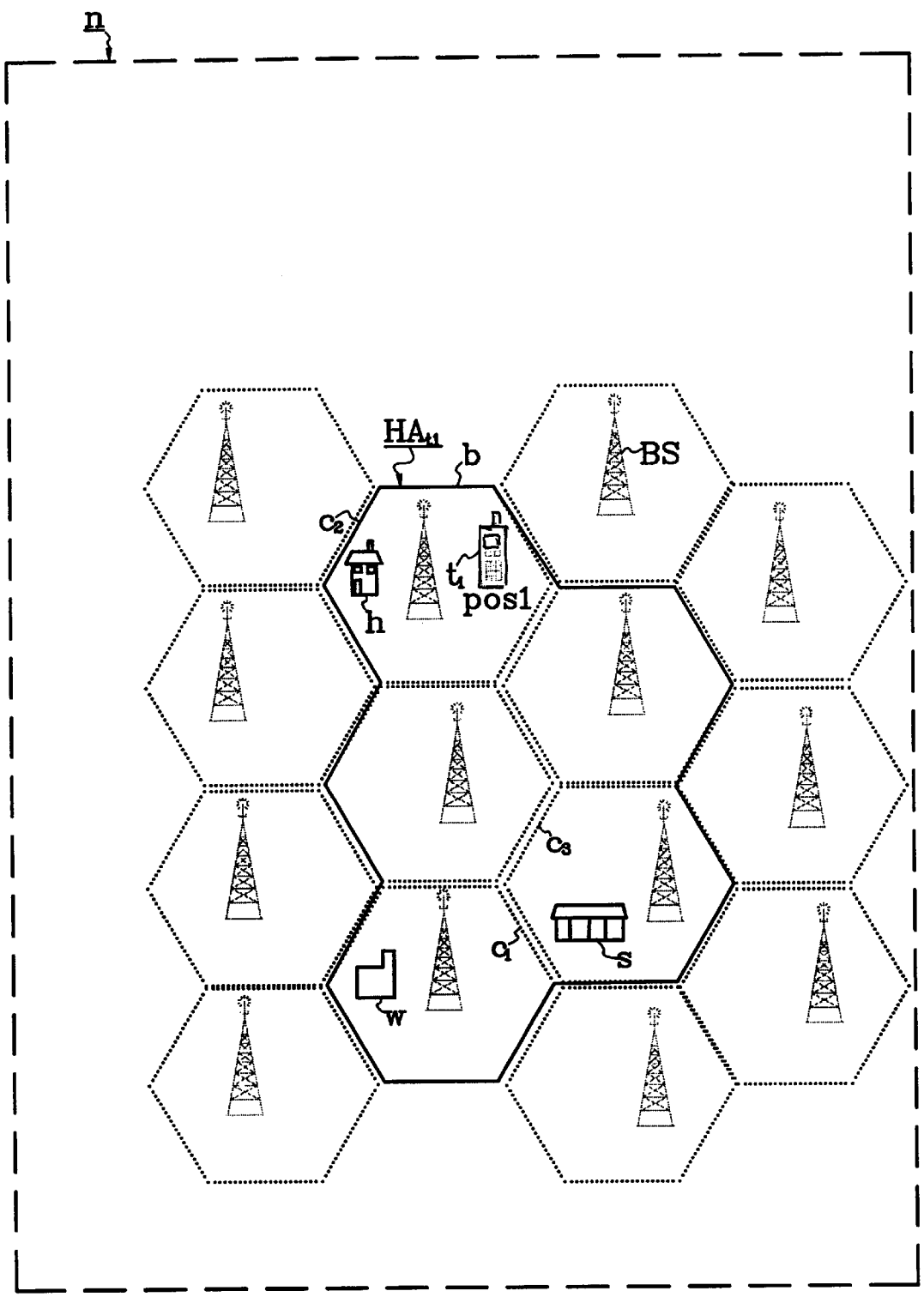
FIG. 2 illustrates a schematic view of a home location area in the network adapted to a terminal according to the invention.

FIG. 2 shows a schematic view of the first terminal $t_1$ located in its home location area $HA_{t1}$ in the network n.

The work w of the user of the first terminal $t_1$ is located inside a first cell $c_1$, the home h of the user of the first terminal $t_1$ is located inside a second cell $c_2$. Stores s often visited by the user of the first terminal $t_1$ are located inside a third cell $c_3$. Each cell $c_1$–$c_3$ comprises a basestation BS connected to the network n.

The creation of the home location area $HA_{t1}$ of the first terminal $t_1$ is done by including cell borders in the location area, which cell borders are frequently crossed by the first terminal $t_1$. These cell borders are for example the border of the cells $c_1$–$c_3$, which are often crossed by the first terminal $t_1$, as shown in FIG. 2.

A border b of the home location area $HA_{t1}$ is built up by cell borders, which are less frequently crossed by the first terminal $t_1$. Hereby the number of location updates between the first terminal $t_1$ and a corresponding basestation BS in a cell are kept low by placing the frequently crossed cell borders of the first terminal $t_1$ inside the home location area $HA_{t1}$.

In this example according to FIG. 2 the home location area $HA_{t1}$ of the first terminal $t_1$ is created as an example. Of course the same method can be applied for the creation of a home location area belonging to the second terminal $t_2$ or other terminals located in the network n.

The algorithm used by the invention for creating a home location area $HA_{t1}$ uses as mentioned above long term statistics that the corresponding first terminal $t_1$ continuously records of its movements and pages. The statistics recorded by the first terminal $t_1$ for the calculation of the home location area $HA_{t1}$ are only recorded while the first terminal $t_1$ is in the session mode.

The first terminal $t_1$ comprise a non-volatile memory buffer, which contains recorded statistics from the latest period of time done by the first terminal $t_1$. The length of this time is for example 100 days.

Each time the first terminal $t_1$ initially registrates to the network n (i.e. when it is powered on or when it enters the coverage area of the network n), the first terminal $t_1$ uses the long term statistics stored in the non-volatile memory buffer to calculate a suitable home location area $HA_{t1}$ consisting of. certain suitable cells. The first terminal $t_1$ then transfers the definition of the home location area $HA_{t1}$ to the network n.

If the first terminal $t_1$ remains logged on to the network n for a very long time, it is also possible to let the first terminal ti periodically calculate a new home location area $HA_{t1}$ and transfer the definition of the new home location area $HA_{t1}$ to the network n.

The first terminal $t_1$ records the long term statistics according to the invention because the first terminal $t_1$ is able to record more detailed statistics about cell border crossings and cell duration times than the network n is able to do. This is because the first terminal $t_1$ is constantly aware of the cell it is located in, while the network n only has this detailed information while it is in contact with the first terminal $t_1$.

In case the network n is a universal network described above, the network n does not store any permanent subscriber or terminal related data. Hence the network n is not able to record any long term statistics for the terminals $t_1$, $t_2$ in the network n. The most convenient way is therefore to let the terminal record the data.

The invention creates a session mode-fast adaptive location area $FA_s$ customised to the terminal $t_1$, $t_2$ in the case when the terminal $t_1$, $t_2$ and the network n enter the session mode and when the terminal $t_1$, $t_2$ is located outside the area which constitute the normal mobility pattern of the terminal $t_1$, $t_2$ in the network n (i.e. the latest calculated home location area).

The creation of the session mode-fast adaptive location area $FA_s$ is based on short term statistics of the terminal $t_1$, $t_2$ which statistics are collected and stored simultaneously by the terminal $t_1$, $t_2$ and the network n at every contact between the terminal $t_1$, $t_2$ and the network n.

According to the invention the session mode-fast adaptive location area $FA_s$ is calculated in both the terminal $t_1$, $t_2$ and the network n, using the same algorithm and the same input data to the algorithm for calculating the location area. A session mode-fast adaptive location area $FA_s$ is always created so that the current position of the terminal $t_1$, $t_2$ is located close to the centre, or at least a significant distance from the border, of the session mode-fast adaptive location area $FA_s$.

The session mode-fast adaptive location area $FA_s$ use as short term statistics the current and recent position, speed and movement direction of the terminal $t_1$, $t_2$ in the network n. In addition, the average frequencies of incoming and outgoing traffic to and from the terminal $t_1$, $t_2$ are used in the calculations.

The basestation BS in each cell in the network n broadcasts the geographical co-ordinates that best represent the centre of the cell and the position of the terminal $t_1$, $t_2$ is set to be the geographical co-ordinates of the current cell in which the terminal $t_1$, $t_2$ is located.

The speed of the terminal $t_1$, $t_2$ is defined as the distance between the last two known positions of the terminal $t_1$, $t_2$ divided by the time that has lapsed between these two position recordings.

The movement direction of the terminal $t_1$, $t_2$ is derived according to the invention from the two or more last known positions of the terminal $t_1$, $t_2$.

Since the terminal $t_1$, $t_2$ and the network n uses the same data for calculating a suitable session mode-fast adaptive location area $FA_s$, only the positions of the terminal $t_1$, $t_2$ when it is in contact with the network n can be recorded and used by both the terminal $t_1$, $t_2$ and the network n. Therefore the terminal $t_1$, $t_2$ and the network n simultaneously record the time and the geographical co-ordinates of the terminal $t_1$, $t_2$ every time the terminal $t_1$, $t_2$ is in contact with the network n, as mentioned above.

The terminal $t_1$, $t_2$ is in contact with the network n for example when the terminal $t_1$, $t_2$ initially registrates to the network n, every time the terminal $t_1$, $t_2$ performs location updating, periodic registration to the network n or a handover, and every time an incoming or outgoing call is set-up to or from the terminal $t_1$, $t_2$, and subsequently when this call is released.

A new session mode-fast adaptive location area $FA_s$ is calculated at each of the above listed contacts, except at call set-up or handover, between the terminal $t_1$, $t_2$ and the network n. A new session mode-fast adaptive location area $FA_s$ for the terminal $t_1$, $t_2$ is also calculated when the terminal $t_1$, $t_2$ crosses the border of its current session mode-fast adaptive location area $FA_s$.

At a call set-up and handover no new session mode-fast adaptive location area $FA_s$ is calculated as there is an established communication between the terminal $t_1$, $t_2$ and the network n, and no location area is therefore needed. Data is though recorded at a call set-up and at handover, which data is to be used in later calculations of the session mode-fast adaptive location area $FA_s$.

The session mode-fast adaptive location areas $FA_s$ according to the invention reduces the load imposed by the terminal $t_1$, $t_2$ on the network n. This is achieved since in most cases a new session mode-fast adaptive location area $FA_s$ can be calculated without transferring any data between the terminal $t_1$, $t_2$ and the network n for this purpose. Furthermore the terminal $t_1$, $t_2$ is always some distance from the border of the session mode-fast adaptive location area $FA_s$ when the location area is created as the current position of the terminal $t_1$, $t_2$ is located close to the centre, or at least a significant distance from the border, of the created session mode-fast adaptive location area $FA_s$. Thereby repeated location updates caused by the terminal $t_1$, $t_2$ moving back and forth in the region of the location area border are avoided.

Another favourable property is that the session mode-fast adaptive location area $FA_s$ for a stationary terminal quite soon shrink to a size including only the single cell where the terminal $t_1$, $t_2$ is located. This is because the speed of the terminal $t_1$, $t_2$ turns to zero, as described above, and this results in that the session mode-fast adaptive location area $FA_s$ for the terminal comprise the co-ordinates of the position of the terminal, i.e. the geographical co-ordinates of the current cell in which the terminal $t_1$, $t_2$ is located.

The session mode-fast adaptive location area $FA_s$ also distributes the location update load more evenly between the cells in the network n than is the case with fixed location areas, as in this case the location updating of a terminal in the network is concentrated to the cells located along the border of the corresponding fixed location area.

When the session mode-fast adaptive location area $F_s$ is used according to the invention, the border of the location area can coincide with any cell border in the network. Furthermore, the border of the session mode-fast adaptive location area $FA_s$ is different for different terminals in the network according to the invention. Thereby the load imposed by a location update in the network is not concentrated to certain cells.

The algorithm used for calculating the session mode-fast adaptive location area $FA_s$ in both the terminal $t_1$, $t_2$ and in the network n uses, apart from the short term statistics described above, also focal points $r_p$, a generalised radius $R_G$ and in some cases the local cell density. The focal points $r_p$ and the generalised radius $R_G$ are described in more detail below in association with FIGS. 3a–3d.

As input data to the algorithm a chosen number of recent positions of the terminal $t_1$, $t_2$ in the network n is used as well as the instant of time for the registration of these positions by the terminal $t_1$, $t_2$. The mentioned positions and the mentioned instant of times for the registration of these positions are further used to calculate the average speed of the terminal $t_1$, $t_2$ when the terminal $t_1$, $t_2$ moved between two following registered positions of the terminal $t_1$, $t_2$ in the network n. In addition, the average frequencies of incoming and outgoing traffic to and from the terminal $t_1$, $t_2$ are used by the algorithm.

As an option the local cell density, defined as the average number of cells per area unit in the vicinity of the present location of the terminal, can also be used as input data to the algorithm. In this case the algorithm will become more effective, but it means that the network n must transfer the value of the cell density to the terminal $t_1$, $t_2$, which is a load on the radio resources in the network n. A fixed value of the cell density can as an alternative be used as input data to the algorithm, which fixed value is defined for the whole network n and only needs to be transferred to the terminal $t_1$, $t_2$ once. This transfer could for example take place when the terminal $t_1$, $t_2$ logs on to the network n.

In case the local cell density is used as input data to the algorithm, the local cell density must be known by both the terminal $t_1$, $t_2$ and the network n, as mentioned above. Therefore the local cell density has to be conveyed by the network n to the terminal $t_1$, $t_2$ either by broadcasting the density in every cell or by signalling the density during each contact between the terminal $t_1$, $t_2$ and the network n, when a new session mode-fast adaptive location area $FA_s$ should be calculated for the terminal $t_1$, $t_2$. In the latter case the local cell density only has to be signalled from the network n to the terminal $t_1$, $t_2$ when it is different from what it was the last time a session mode-fast adaptive location area was calculated for the terminal $t_1$, $t_2$.

The focal points $r_p$ and the generalised radius $R_G$ are used as output data from the algorithm used by the session mode-fast adaptive location area $FA_s$. Together they define the shape, the position and the size of the session mode-fast adaptive location area $FA_s$ for the terminal $t_1$, $t_2$.

The generalised radius $R_G$ represents the size of the session mode-fast adaptive location area $FA_s$ and the distribution of the focal points $r_p$ represents the shape and the position of the session mode-fast adaptive location area $FA_s$. Specifically, the relative positions of the focal points $r_p$ define the shape of the session mode-fast adaptive location area $FA_s$ and their absolute positions define the position of the session mode-fast adaptive location area $FA_s$.

The relative positions of the focal points $r_p$ are calculated by using a chosen number of recent positions of the terminal $t_1$, $t_2$ in the network n as well as the average speed of the terminal $t_1$, $t_2$ during the movement of the terminal $t_1$, $t_2$ between these positions. The distance between the focal points $r_p$ is scaled up or down thereafter depending on the value of the calculated generalised radius $R_G$. The scaling of the distance between the focal points $r_p$ is done to maintain the shape of the location area irrespective of what the calculated generalised radius $R_G$ turns out to be.

The generalised radius $R_G$ is defined as the sum of the distances from a point r(borderline) at a border $b_2$ of the session mode-fast adaptive location area $FA_s$ to each of the focal points $r_p$ inside this area $FA_s$ as shown in the figures.

Equation 1 below describes a formula for defining the generalised radius $R_G$ of the session mode-fast adaptive location area $FA_s$ comprising a number $n_{FP}$ of focal points $r_p$:

Equation 1: The generalised radius $$R_G = \sum_{i=0}^{n_{FP}-1} |r(borderline) - r_{pi}|$$

Figure 3A:
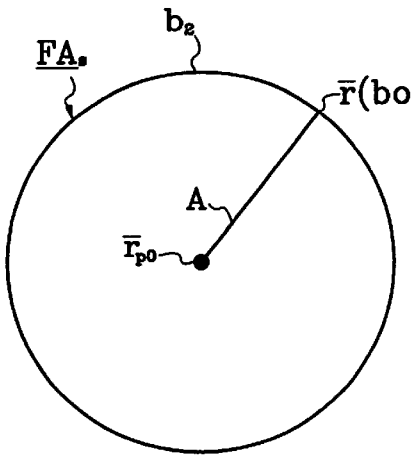
FIGS. 3a, 3b, 3c, 3d illustrates different shapes of fast adaptive location areas in the network according to the invention.

FIG. 3a shows a schematic view of the session mode-fast adaptive location area $FA_s$ comprising one focal point $r_{p0}$ located at a distance A from a point r(borderline) at the border $b_2$. The number of focal points $n_{FP}$ is equal to 1 and the session mode-fast adaptive location area $FA_s$ is therefore a circle with the generalised radius $R_G$=A according to equation 1.

Figure 3B:
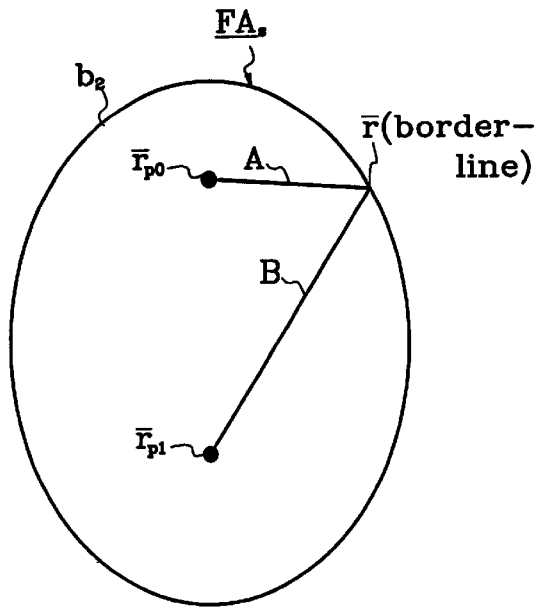

FIG. 3b shows a schematic view of the session mode-fast adaptive location area $FA_s$ comprising two focal points $r_{p0}$, $r_{p1}$ located at a distance A respective B from a point r(borderline) at the border $b_2$. The number of focal points $n_{FP}$ is equal to 2 and the session mode-fast adaptive location area $FA_s$ is therefore an ellipse with the generalised radius $R_G$=A+B according to equation 1.

Figure 3C:
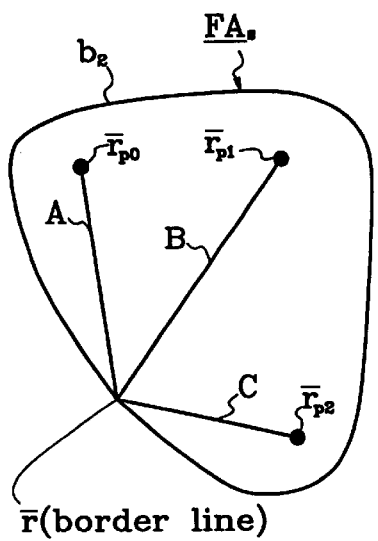

FIG. 3c shows a schematic view of the session mode-fast adaptive location area $FA_s$ comprising three focal points $r_{p0}$, $r_{p1}$, $r_{p2}$ located at a distance A, B respective C from a point r(borderline) at the border $b_2$. The number of focal points $n_{FP}$ is equal to 3 and the session mode-fast adaptive location area $FA_s$ has therefore an irregular shape with the generalised radius $R_G$=A+B+C according to equation 1.

A point r(area) lying inside the session mode-fast adaptive location area $FA_s$ satisfies according to equation 1 the following relation 2:

Relation 2: The generalised radius $$R_G >= \sum_{i=0}^{n_{FP}-1} |r(area) - r_{pi}|$$

Figure 3D:
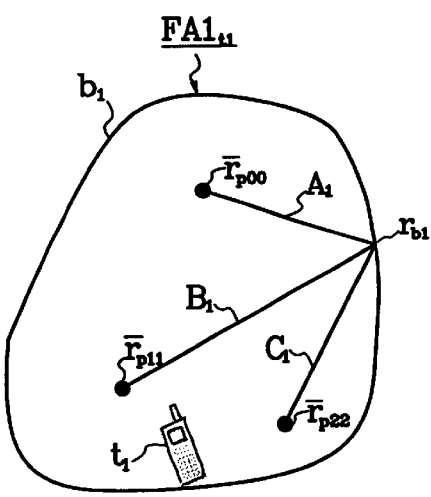

FIG. 3d shows a schematic view of the first terminal $t_1$ located in a current session mode-fast adaptive location area $FA1_{t1}$. The current session mode-fast adaptive location area $FA1_{t1}$ in this example comprise three focal points $r_{p00}$, $r_{p11}$, $r_{p22}$ located at a distance $A_1$, $B_1$ respective $C_1$ from a border point $r_{b1}$. The border point $r_{b1}$ is a point on a border $b_1$ of the current session mode-fast adaptive location area $FA1_{t1}$.

When the first terminal $t_1$ wants to determine whether it has reached the border of the current session mode-fast adaptive location area $FA1_{t1}$ or not, the first terminal $t_1$ checks whether the geographical co-ordinates of its current cell satisfies relation 2.

If the geographical co-ordinates of the current cell of the first terminal $t_1$ satisfy relation 2 then the first terminal $t_1$ is still in the current session mode-fast adaptive location area $FA1_{t1}$. Otherwise the first terminal $t_1$ has left the current session mode-fast adaptive location area $FA1_{t1}$ and a new session mode-fast adaptive location area has to be calculated for the terminal $t_1$.

In the case when the terminal $t_1$, $t_2$ and the network n enter the packet mode or the transaction mode, the invention creates a fast adaptive location area customised to the terminal $t_1$, $t_2$, irrespective of where the terminal $t_1$, $t_2$ is located in the network n. This fast adaptive location area is called a packet mode/transaction mode-fast adaptive location area $FA_{pt}$.

The packet mode/transaction mode-fast adaptive location area $FA_{pt}$ is a continuously changing location area, which is triggered by an active period of a certain length and then grows continuously as a function of the time during the subsequent silent period in a communication between the terminal $t_1$, $t_2$ and the network n.

The packet mode-fast adaptive location area and the transaction mode-fast adaptive location area are of the same type, i.e. they use the same algorithms. The difference between them is that they use different values of the parameters in the algorithms.

According to the invention the packet mode/transaction mode-fast adaptive location area $FA_{pt}$ is calculated in both the terminal $t_1$, $t_2$ and the network n, using the same algorithm and the same input data to the algorithm for calculating the packet mode/transaction mode-fast adaptive location area. A packet mode/transaction mode-fast adaptive location area $FA_{pt}$ is always created so that the current position of the terminal $t_1$, $t_2$ is located close to the centre, or at least a significant distance from the border, of the packet mode/transaction mode-fast adaptive location area $FA_{pt}$.

The creation of the packet mode/transaction mode-fast adaptive location area $FA_{pt}$ is based on short term statistics of the terminal $t_1$, $t_2$, which statistics are collected and stored simultaneously by the terminal $t_1$, $t_2$ and the network n at every contact between the terminal $t_1$, $t_2$ and the network n, as well as focal points $r_p$ and a generalised radius $R_G$.

The packet mode/transaction mode-fast adaptive location area $FA_{pt}$ use as short term statistics for example the current and recent position, speed and movement direction of the terminal $t_1$, $t_2$ in the network n, as well as statistics of the length of the silent periods between the active periods in the communication between the terminal $t_1$, $t_2$ and the network n. These statistics are constantly collected and the statistics from the latest period of time are always used when calculating the packet mode/transaction mode-fast adaptive location area $FA_{pt}$.

The time duration since the last active communication period is used by the terminal $t_1$, $t_2$ and the network n to calculate the generalised radius $R_G$ as a function of the time is also used, as described below.

The algorithm used for calculating the packet mode/transaction mode-fast adaptive location area $FA_{pt}$ in both the terminal and in the network use as input data statistics of the length of the silent periods between the active periods in the communication between the terminal $t_1$, $t_2$ and the network n, as well as the input data used in the algorithm for calculating a session mode-fast adaptive location area $FA_s$ (except the average frequencies for incoming and outgoing traffic to and from the terminal $t_1$, $t_2$).

The focal points $r_p$ and the generalised radius $R_G$ are used as output data from the algorithm used by the packet mode/transaction mode-fast adaptive location area $FA_{pt}$. Together they define the shape, the position and the size of the session mode-fast adaptive location area $FA_s$ for the terminal $t_1$, $t_2$. The generalised radius $R_G$ represents the size of the packet mode/transaction mode-fast adaptive location area $FA_{pt}$ and is a function of the time, as described below.

The distribution of the focal points $r_p$ represents the shape and the position of the packet mode/transaction mode-fast adaptive location area $FA_{pt}$. Specifically, the relative positions of the focal points $r_p$ define the shape of the packet mode/transaction mode-fast adaptive location area $FA_{pt}$ and their absolute positions define the position of the packet mode/transaction mode-fast adaptive location area $FA_{pt}$.

The same algorithms for the distribution of the focal points $r_p$ are used when calculating the packet mode/transaction mode-fast adaptive location area $FA_{pt}$ as for the session mode-fast adaptive location area $FA_s$ described above.

The calculation of the generalised radius $R_G$ uses a different algorithm when the terminal $t_1$, $t_2$ and the network n has entered the packet mode or the transaction mode than the session mode-fast adaptive location area $FA_s$. The optimal generalised radius for the session mode-fast adaptive location area $FA_s$ is calculated by expressing the expected paging load, the location updating load and the periodic registration load as functions of the generalised radius. Thereafter is calculated at what generalised radius the sum of these functions has its minimum.

The same principle is used when calculating the optimal generalised radius for the packet mode/transaction mode-fast adaptive location area $FA_{pt}$, but a parameter concerning the time duration since the last active communication period is also used. It is suitable in this case to let the packet mode/transaction mode-fast adaptive location area $FA_{pt}$ grow the longer a silent period in a communication between the terminal $t_1$, $t_2$ and the network becomes.

It is just the size of the packet mode/transaction mode-fast adaptive location area $FA_{pt}$ that is changing with the time as the generalised radius $R_G$ changes with the time. The shape and the position of the packet mode/transaction mode-fast adaptive location area $FA_{pt}$ is not changing with time, only at every contact between the terminal $t_1$, $t_2$ and the network n as a new packet mode/transaction mode-fast adaptive location area $FA_{pt}$ is created then.

As the size of the packet mode/transaction mode-fast adaptive location area $FA_{pt}$ is changing with the time, the terminal $t_1$, $t_2$ needs to calculate the momentary size of the packet mode/transaction mode-fast adaptive location area $FA_{pt}$ every time the terminal $t_1$, $t_2$ enters a new cell in the network n, in order to determine whether the new cell is located inside or outside the current location area.

Further the network n needs to calculate the momentary packet mode/transaction mode-fast adaptive location area $FA_{pt}$ every time the terminal $t_1$, $t_2$ has to be paged by the network n, so that the cells belonging to the current location area of the terminal $t_1$, $t_2$, and in which cells the terminal $t_1$, $t_2$ thus has to be paged, can be identified by the network n.

The first reason for the different calculations of the generalised radius $R_G$ for the session mode-fast adaptive location area $FA_s$ and the packet mode/transaction mode-fast adaptive location area $FA_{pt}$ is that the algorithm for the session mode-fast adaptive location area $FA_s$ uses a call frequency, which is a constant representing an average of the actual call frequency.

Short lasting active periods in a communication or little longer lasting active periods in a communication, as is the case for the packet mode or the transaction mode, arrive in bursts followed by long intervals and therefore the call frequency must for the packet mode/transaction mode-fast adaptive location area $FA_{pt}$ reflect the higher traffic intensity within the bursts and the lower traffic intensity in between the bursts in this case.

The second reason is that the algorithm for calculating the session mode-fast adaptive location area $FA_s$ is based on a Poisson distributed model. The Poison model is not applicable to information in packets, as is the case for calculation of the packet mode/transaction mode-fast adaptive location area $FA_{pt}$.

The terminal $t_1$, $t_2$ and the network n changes dynamically between the different modes and adapts themselves to the present type of traffic sent between the terminal $t_1$, $t_2$ and the corresponding basestation $BS_1$–$BS_9$ in the network n, which as described above, determines what type of location area $HA_{r1}$, $HA_{r2}$, $FA1_{r1}$ $FA_s$, $FA_{pt}$ the terminal $t_1$, $t_2$ should use. A default mode is assumed to be used according to the invention, for example the session mode, when the terminal $t_1$, $t_2$ logs on to the network n.

In a special case according to the invention, the terminal $t_1$, $t_2$ and the network n enter the session mode if the generalised radius $R_G$ for the packet mode/transaction mode-fast adaptive location area $FA_{pt}$ for the terminal $t_1$, $t_2$, which has entered the packet mode or the transaction mode, would at any point in time exceed a generalised radius $R_{GS}$. The generalised radius $R_{GS}$ corresponds to the generalised radius for the session mode-fast adaptive location area $FA_s$ for the terminal $t_1$, $t_2$ in the session mode as calculated at the last contact between the terminal $t_1$, $t_2$ and the network n as if the terminal $t_1$, $t_2$ had then been in the session mode.

In the following example is described a method according to the invention in association with FIGS. 1, 4a, 4b and the above examples.

Figure 4A:
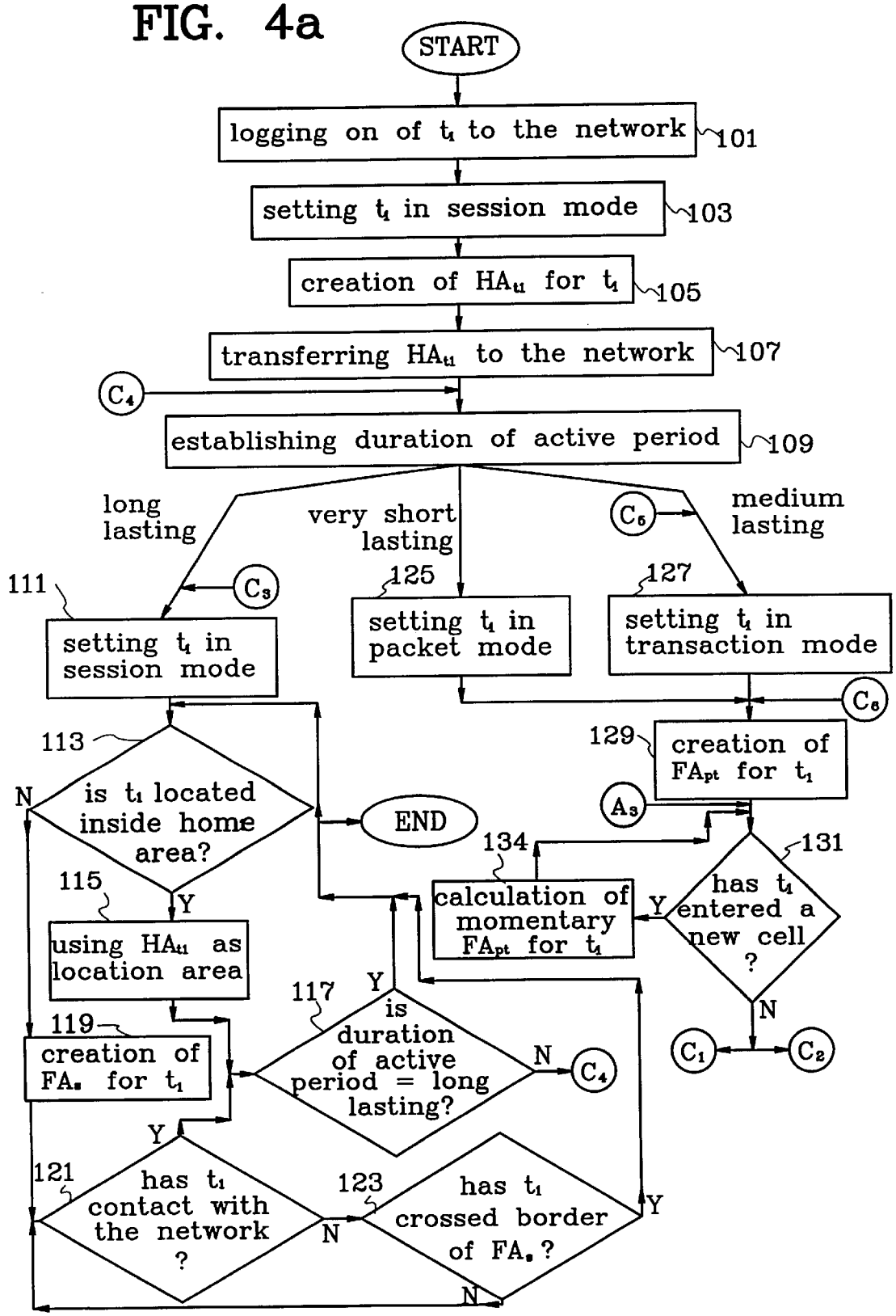
FIGS. 4a, 4b is a flowsheet illustrating a method according to the invention.
Figure 4B:
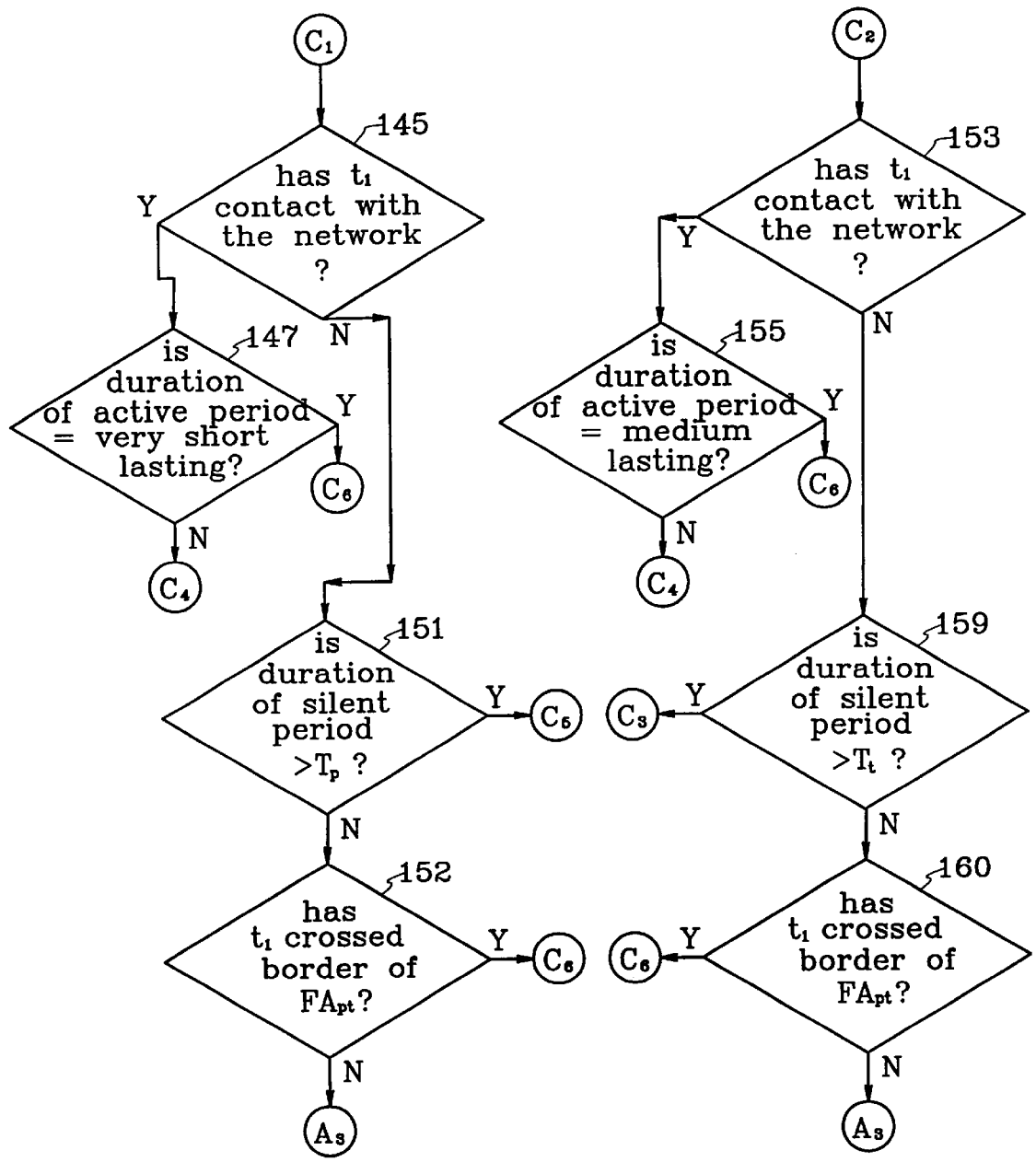

FIGS. 4a and 4b illustrates a flowsheet of a method according to the invention. The method is described for the first terminal $t_1$ as an example, and of course the same method can be applied to the second terminal $t_2$ or other terminals located in the network n.

It is assumed in the following example that the first terminal $t_1$ is in an initial state located at the first position pos1 in FIG. 1 and the first terminal $t_1$ (and the network n) enters the session mode when the first terminal $t_1$ logs on to the network n.

For the first terminal $t_1$ in the network n, the network n uses a mode corresponding to the same type of mode as used by the first terminal $t_1$.

The method begins with that the user of the first terminal $t_1$ in step 101 in FIG. 4a logs on the first terminal $t_1$ to the network n by for example pushing a button on the first terminal $t_1$. The first terminal $t_1$ (and the network n) then automatically enters the session mode in step 103.

In the next step 105 the first terminal $t_1$ starts with creating, according to the algorithm described above, a home location area $HA_{t1}$ adapted to the long term movements of the first terminal $t_1$.

The calculated home location area $HA_{t1}$ in the first terminal $t_1$ is in step 107 transferred to the network n.

The first terminal $t_1$ (and the network n) continues in step 109 to establish the duration of the current active period that is existing in a communication between the first terminal $t_1$ and the network n.

The first terminal $t_1$ (and the network n) establishes in this example a communication with a long lasting active period, which for example could be a circuit switched communication. This communication is also called a long lasting communication below. Therefore the first terminal $t_1$ (and the network n) in step 111 still is triggered to be in the session mode.

In the next step 113 the first terminal $t_1$ according to the invention establishes whether the geographical position of the first terminal $t_1$ is inside an home area constituting the normal mobility pattern of the movements of the first terminal $t_1$, based on long term statistics of the movements of the first terminal $t_1$.

In this example the first terminal $t_1$ is assumed to be located at the first position pos1 in FIG. 1 and therefore located inside the home area. The first terminal $t_1$ then in step 115, as well as the network n, uses the home location area $HA_{t1}$ created in step 105 as the location area for the first terminal $t_1$.

In the case where the first terminal $t_1$ is assumed to be located at the second position pos2 in FIG. 1, then the first terminal $t_1$ is not located inside the home area (i.e. the latest calculated home location area) and therefore both the first terminal $t_1$ and the network n in step 119 calculates a session mode-fast adaptive location area $FA_s$ adapted to the short term movements of the terminal $t_1$.

When the first terminal $t_1$ in step 121 has contact with the network n, a new session mode-fast adaptive location area is calculated in both the first terminal $t_1$ and the network n in case the first terminal $t_1$ still is located outside the home area, according to step 113, and the communication between the first terminal $t_1$ and the network n still is long lasting, according to step 117. The mentioned contact does not include call set-ups or handovers, as there is an established communication between the first terminal $t_1$ and the network n and therefore no location area is needed in these cases. Data is though recorded at call set-ups and at handovers, which data is to be used in later calculations of the session mode-fast adaptive location area $FA_s$.

Similarly in the next step 123, when the first terminal $t_1$ has reached the border of the current session mode-fast adaptive location area $FA_s$, a new session mode-fast adaptive location area is calculated in both the first terminal $t_1$ and the network n in case the first terminal $t_1$ still is located outside the home area, according to step 113. The first terminal $t_1$ has left the current session mode-fast adaptive location area $FA_s$, according to step 123, in case the geographical co-ordinates of the current cell, in which the first terminal $t_1$ is located, does not satisfy relation 2 described above.

Now it is assumed that the communication between the first terminal $t_1$ and the network n switches to send very short lasting active periods, which for example could be a packet oriented communication. This communication is also called a very short lasting communication. The first terminal $t_1$ is assumed to be located at the third position pos3 in FIG. 1, inside the home area of the first terminal $t_1$.

The first terminal $t_1$ (and the network n) then after step 117, marked with the notation $C_4$ in FIG. 4a, establishes the duration of the current active period in the communication in step 109 to be very short lasting, and therefore the first terminal $t_1$ (and the network n) according to the invention enters the packet mode in step 125.

In this mode a packet mode/transaction mode-fast adaptive location area $FA_{pt}$ is created simultaneously in the first terminal $t_1$ and the network n for the first terminal $t_1$ in step 129, adapted to the first terminal $t_1$ as described in the above examples.

The packet mode/transaction mode-fast adaptive location area $FA_{pt}$ is created for the first terminal $t_1$ irrespective of the position of the first terminal $t_1$ in the network n.

In case the first terminal $t_1$ in step 131 enters a new cell in the network n, a momentary packet mode/transaction mode-fast adaptive location area $FA_{pt}$ is calculated for the first terminal $t_1$ in step 134, as described above.

Every time the first terminal $t_1$ is in contact with the network n in step 145, as marked with the notation $C_1$ in FIGS. 4a and 4b, a new packet mode/transaction mode-fast adaptive location area $FA_{pt}$ is created for the first terminal $t_1$ in step 129 in case the communication between the first terminal $t_1$ and the network n still is very short lasting, according to step 147. This is marked in FIGS. 4a and 4b with the notation $C_6$.

In case the communication between the first terminal $t_1$ and the network n is not very short lasting according to step 147, the method continuous to step 109 as marked with the notation $C_4$ in FIGS. 4a and 4b. The terminal $t_1$ (and the network n) enters thereby a new suitable mode depending on the duration of the current active period in the communication.

If the duration of a current silent period in the communication between the terminal $t_1$ and the network n in the next step 151 exceeds the threshold value $T_p$ as described above, then the first terminal $t_1$ (and the network n) enters the transaction mode according to step 127. This is marked with the notation $C_5$ in FIGS. 4a and 4b.

Otherwise the first terminal continues to step 152 to check whether it has crossed the border of the packet mode/ transaction mode-fast adaptive location area. If this is the case a new packet mode/transaction mode-fast adaptive location area is created according to step 129. This is marked with the notation $C_6$ in FIGS. 4a and 4b. Otherwise the first terminal $t_1$ continues to step 131 to check whether the terminal $t_1$ has entered a new cell. This is marked with the notation $A_3$ in FIGS. 4a and 4b.

In another example according to the invention the communication between the first terminal $t_1$ and the network n consists of active periods with a time length within a specified window length as described above, which for example could be a transaction oriented communication. This communication is also called a medium lasting communication. The first terminal $t_1$ (and the network n) in the above described example in step 109 establishes the duration of an active period in the communication to be medium lasting. Therefore the first terminal $t_1$ (and the network n) in step 127 enters the transaction mode.

The terminal $t_1$ continues in step 129 to create a packet mode/transaction mode-fast adaptive location area $FA_{pt}$. This kind of location area is described above when the first terminal $t_1$ has entered the packet mode. The procedure for the first terminal $t_1$ follows the above described steps 131–134.

The duration of a current active period in the communication between the first terminal $t_1$ and the network n is checked in step 155 every time the first terminal $t_1$ is in contact with the network n in step 153. This is marked in FIGS. 4a and 4b with the notation $C_2$.

In case the communication between the first terminal $t_1$ and the network n still is medium lasting, according to step 155, a new packet mode/transaction mode-fast adaptive location area $FA_{pt}$ is created for the first terminal $t_1$ in step 129. This is marked in FIGS. 4a and 4b with the notation $C_6$.

Otherwise, if the communication between the first terminal $t_1$ and the network n is not medium lasting according to step 155, the method continuous to step 109 as marked with the notation $C_4$ in FIGS. 4a and 4b. The terminal $t_1$ (and the network n) enters thereby a new suitable mode depending on the duration of the current active period in the communication.

The duration of a current silent period in the communication between the terminal $t_1$ and the network n is checked in the next step 159. If this duration exceeds the threshold value $T_r$ as described above, then the first terminal $t_1$ (and the network n) enters the session mode according to step 111. This is marked with the notation $C_3$ in FIGS. 4a and 4b.

Otherwise the first terminal $t_1$ continues to step 160 to check whether it has crossed the border of the packet mode/transaction mode-fast adaptive location area. If this is the case a new packet mode/transaction mode-fast adaptive location area is created according to step 129. This is marked with the notation $C_6$ in FIGS. 4a and 4b. Otherwise the first terminal $t_1$ continues to step 131 to check whether the first terminal $t_1$ has entered a new cell. This is marked with the notation $A_3$ in FIGS. 4a and 4b.

Figure 5:
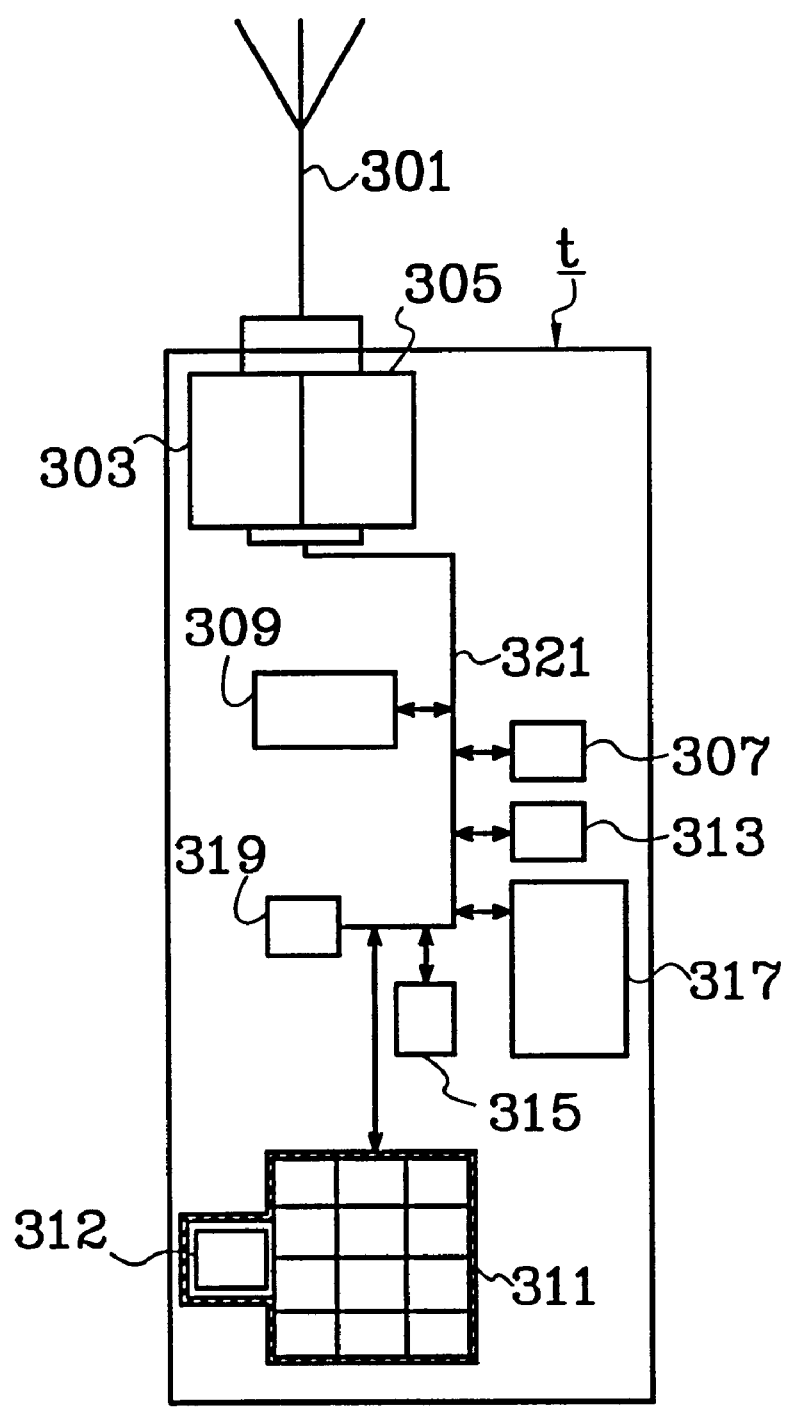
FIG. 5 is a block schematic illustrating a terminal according to the invention.

FIG. 5 depicts a block schematic of a terminal t according to the invention as described above.

The terminal t comprise as an example a receiver 303, a transmitter 305, an input unit 307, a timer unit 309, a keyset 311 including a power on/off button 312, a measuring unit 313, a non-volatile memory 315, a calculating unit 317, and a control unit 319, which are the components shown in FIG. 5. The receiver 303 and the transmitter 305 are connected to an antenna 301. All the units are connected to each other by a databus 321 as shown in the figure.

The user of the terminal t logs on the terminal t to the network n by pushing the power on button 312 on the keyset 311 on the terminal t, wherein the input unit 307 registrates this and the terminal t enters for example the session mode according to the method described above.

The timer unit 309 in the terminal t is used for example to trigger the terminal t to enter the session mode or the transaction mode as described above if the duration of a current silent period in a communication exceeds a certain threshold value $T_p$ or $T_r$.

The measuring unit 313 is used by the terminal t for distinguishing the information in a communication between the terminal t and the network n. The measuring unit 313 measures the duration of a current active period in the communication between the terminal t and the network n and the duration of a current silent period in between two active periods. Long lasting communications triggers the terminal t to enter the session mode, medium lasting communications triggers the terminal t to enter the transaction mode and very short lasting communications triggers the terminal t to enter the packet mode as described in the above example.

The non-volatile memory 315 in the terminal t is used for storing the above mentioned recorded statistics, also called data, from the latest period of time done by the terminal t, which data is used later in time by the calculating unit 317 for calculating a suitable location area.

The calculating unit 317 calculates suitable location areas for the terminal t in the network according to the examples described above.

The units 303, 305, 307, 309, 311, 312, 313, 315, 317 and 319 in the terminal t are connected to the databus 321, through which the units communicate with each other. The control unit 319 in the terminal t controls the different units via the data bus 321 and affects them to perform wanted operations according to the invention.

The invention described above may be embodied in yet other specific forms without departing from the spirit or essential characteristics thereof. Thus, the present embodiments are to be considered in all respects as illustrative and not restrictive, the scope of the invention being indicated by the appended claims rather than by the foregoing descriptions, and all changes which come within the meaning and range of equivalency of the claims are therefore intended to be embraced therein.

What is claimed is:

1. A method for adapting a location area to a terminal within a communications network, comprising the steps of:

logging the terminal onto the network;

creating a long term adapted location area, adapted to a long term mobility pattern of a user of the terminal in the network;

determining a type of communication between the terminal and the network;

entering the terminal and the network in a mode corresponding to the determined communication type, wherein the different modes for the terminal and the network include session mode, packet mode and transaction mode;

using the long term adapted location area when the terminal is located in a home area of the terminal and when the terminal and the network enter the session mode;

creating a short term adapted session-location area when the terminal is located outside the home area of the terminal and when the terminal and the network enter the session mode; and creating a short term adapted packet/transaction-location area when the terminal and the network enter at least one of the packet mode and the transaction mode.

2. The method according to claim 1, wherein the method includes the further step of entering the terminal and the network in an initial mode when the terminal logs on to the network.

3. The method according to claim 2, wherein the step of entering the terminal and the network in an initial mode includes the step of setting the initial mode to be the session mode.

4. The method according to claim 1, wherein the method includes the step of basing the long term adapted location area on statistics continuously collected and stored by the terminal in the network, the long term adapted location area being created by the terminal and transferred to the network at the step of logging the terminal onto the network.

5. The method according to claim 1, wherein the method includes the step of periodically creating an updated long term adapted location area and transferring the definition of the updated long term adapted location area to the network when the terminal remains logged on to the network for a selected period of time.

6. The method according to claim 1, wherein the method includes the step of measuring at least one of a duration of active periods in the communication between the terminal and the network and a duration of silent periods between the active periods to determine the type of communication.

7. The method according to claim 6, wherein the method includes the step of entering the terminal and the network in the session mode when the duration of an active period in the communication between the terminal and the network is greater than a predetermined period.

8. The method according to claim 7, wherein the predetermined period is approximately equal 20 seconds.

9. The method according to claim 6, wherein the method includes the step of entering the terminal and the network in the packet mode when the duration of an active period in the communication between the terminal and the network is less than a predetermined period.

10. The method according to claim 9, wherein the predetermined period is approximately equal to 2.5 seconds.

11. The method according to claim 6, wherein the method includes the step of entering the terminal and the network in the transaction mode when the duration of an active period in the communication between the terminal and the network is greater than a first predetermined period and less than a second predetermined period.

12. The method according to claim 11, wherein the first predetermined period is approximately equal to 2.5 seconds and the second predetermined period is approximately equal to 20 seconds.

13. The method according to claim 6, wherein the method includes the step of entering the terminal and the network in the transaction mode when the duration of a silent period in the communication between the terminal and the network exceeds a first threshold time period.

14. The method according to claim 13, wherein the method includes the step of entering the terminal and the network in the session mode when the duration of a silent period in the communication between the terminal and the network exceeds a second threshold time period.

15. The method according to claim 1, wherein the method includes the step of creating a new short term adapted session-location area by the terminal and the network for at least one of (i) each contact between the terminal and the network and (ii) when the terminal reaches a border of a current short term adapted session-location area, if the terminal is located in the current short term adapted session-location area.

16. The method according to claim 1, wherein the method includes the steps of:
creating a new short term adapted packet/transaction-location area by the terminal and the network at each contact between the terminal and the network if the terminal is located in a current short term adapted packet/transaction-location area; and
using a momentary short term adapted packet/transaction-location area by at least one of (i) the terminal when the terminal enters a new cell in the network and (ii) the network when the network pages the terminal in the network, if the terminal is located in the current short term adapted packet/transaction-location area.

17. The method according to claim 1, wherein the creation of the short term adapted session-location area and the short term adapted packet/transaction-location area use radius and focal points, wherein the radius determine the size of the location areas and the focal points determines the shape and the position of the location areas.

18. The method according to claim 1, wherein the network includes a universal network.

19. A method for adapting a location area to a terminal within a communication network, comprising the steps of:
creating the location area for the terminal;
determining a type of communication between the terminal and the network representing a duration of active periods in the communication therebetween, and further representing a duration of silent periods in between the active periods; and
adapting the location area to the type of communication between the terminal and the network.

20. The method according to claim 19, wherein the step of adapting the location area includes:
creating a long term adapted location area, adapted to the long term mobility pattern of a user of the terminal in the network, when the terminal is located in a home area of the terminal and when the terminal and the network enter a session mode;
creating a short term adapted session-location area when the terminal is located outside the home area of the terminal and when the terminal and the network enter the session mode; and
creating a short term adapted packet/transaction-location area when the terminal and the network are set in at least one of a packet mode and a transaction mode.

21. The method according to claim 20, wherein the home area includes an area constituting the normal mobility pattern of the movements of the terminal in the network based on long term statistics of the movements of the terminal in the network.

22. The method according to claim 20, wherein the terminal periodically creates a new long term adapted location area and transfers the definition of the new long term adapted location area to the network when the terminal remains logged on to the network for at least a threshold time period.

23. The method according to claim 20, wherein the method includes the step of collecting and storing data in the terminal and in the network at each contact between the terminal and the network, wherein the data includes information of at least one of the position of the terminal in the network, the speed of the terminal in the network and the direction of the terminal in the network.

24. The method according to claim 20, wherein a new short term adapted session-location area is created by at least one of the terminal and the network at each contact between the terminal and the network and when the terminal reaches a border of a current short term adapted session-location area, if the terminal is located in the current short term adapted session-location area.

25. The method according to claim 20, wherein the creation of the short term adapted session-location area and the short term adapted packet/transaction-location area includes using radius and focal points, wherein the radius determines the size of the location areas and the focal points determine the shape and the position of the location areas.

26. The method according to claim 19, wherein the step of adapting the location area includes creating a short term adapted packet/transaction-location area when the terminal and the network enter at least one of a packet mode and a transaction mode.

27. The method according the claim 26, wherein the step of determining a type of communication includes measuring the duration of the active periods and the duration of the silent periods in between the active periods.

28. The method according to claim 27, wherein the method includes the step of entering the terminal and the network in the transaction mode when a duration of the silent period in the communication between the terminal and the network exceeds a first threshold value.

29. The method according to claim 28, wherein the method includes the step of entering the terminal and the network in the session mode when a duration of the silent period in the communication between the terminal and the network exceeds a second threshold value.

30. The method according to claim 27, wherein the method further includes the step of entering the terminal and the network in an initial mode when the terminal logs on to the network, and wherein the initial mode includes a session mode.

31. The method according to claim 27, wherein the method includes the step of entering the terminal and the network in a session mode when a duration of the active period in the communication between the terminal and the network is greater than a predetermined period.

32. The method according to claim 31, wherein the predetermined period is approximately equal to 20 seconds.

33. The method according to claim 27, wherein the method includes the step of entering the terminal and the network in the packet mode when a duration of the active period in the communication between the terminal and the network is less than a predetermined period.

34. The method according to claim 33, wherein the predetermined period is approximately equal to 2.5 seconds.

35. The method according to claim 27, wherein the method includes the step of entering the terminal and the network in the transaction mode when a duration of the active period in the communication between the terminal and the network is greater than a first predetermined period and less than a second predetermined period.

36. The method according to claim 35, wherein the first predetermined period is approximately equal to 2.5 seconds and the second predetermined period is approximately equal to 20 seconds.

37. The method according to claim 26, wherein a new short term adapted packet/transaction-location area is created by the terminal and the network at each contact between the terminal and the network when the terminal is located in a current short term adapted packet/transaction-location area, and wherein a momentary short term adapted packet/transaction-location area is created by at least one of the terminal when the terminal enters a new cell in the network and the network when the network has to page the terminal in the network, when the terminal is located in the current short term adapted packet/transaction-location area.

38. An apparatus in a communication network which includes a plurality of cells and at least one base station, the apparatus comprising:

a receiver, the receiver receiving signals from the network;

a transmitter, the transmitter transmitting signals to the network, the receiver and the transmitter enabling the apparatus to communicate with the network in a mode determined by at least one of a duration of active periods in the communication and a duration of silent periods between the active periods, wherein an adapted location area is created for the apparatus depending on the mode between the apparatus and the network;

an input unit, the input unit detecting when the apparatus logs on to the network and setting the apparatus in an initial mode;

a timer, the timer triggering the apparatus to enter a predefined mode when the duration of the silent periods in the communication between the apparatus and the network exceeds a predefined threshold value;

a measuring unit, the measuring unit measuring at least one of the duration of the active periods in the communication and the duration of the silent periods between the active periods;

a memory device, the memory device storing data collected by the apparatus at each contact between the apparatus and the network; and a calculating unit, the calculating unit creating location areas for the apparatus using the data stored in the memory device;

wherein a long term adapted location area, adapted to the long term mobility pattern of a user of the apparatus, is created when the apparatus is located in a home area and the apparatus and the network are set in a session mode, and wherein a short term adapted session-location area is created when the apparatus is located outside the home area and the apparatus and the network are set in the session mode, and wherein a short term adapted packet/transaction-location area is created when the apparatus and the network are set in at least one of a packet mode and a transaction mode.

39. The apparatus according to claim 38, wherein the initial mode includes the session mode.

40. The apparatus according to claim 38, wherein the data includes information of at least one of the position of the apparatus in the network, the speed of the apparatus in the network and the direction of the apparatus in the network.

41. The apparatus according to claim 40, wherein the size of the short term adapted session-location area and the short term adapted packet/transaction-location area are determined by a radius, and the shape and the position of the location areas are determined by focal points.

42. The apparatus according to claim 38, wherein the apparatus is set in the session mode when the duration of an active period in the communication between the apparatus and the network is greater than a predetermined period.

43. The apparatus according to claim 42, wherein the predetermined period is approximately equal to 20 seconds.

44. The apparatus according to claim 38, wherein the apparatus is set in the packet mode when the duration of an active period in the communication between the apparatus and the network is less than a predetermined period.

45. The apparatus according to claim 44, wherein the predetermined period is approximately equal to 2.5 seconds.

46. The apparatus according to claim 38, wherein the apparatus is set in the transaction mode when the duration of an active period in the communication between the apparatus and the network is greater than a first predetermined period and less than a second predetermined period.

47. The apparatus according to claim 46, wherein the long term adapted location area is created and transferred to the network at the initial contact between the apparatus and the network when the apparatus logs on to the network.

48. The apparatus according to claim 46, wherein the first predetermined period is approximately equal to 2.5 seconds and the second predetermined period is approximately equal to 20 seconds.

49. The apparatus according to claim 38, wherein the home area includes an area constituting the normal mobility pattern of the movements of the apparatus in the network based on long term statistics of the movements of the apparatus in the network.

50. The apparatus according to claim 38, wherein the network is a universal network.

51. A system for adapting a location area to a terminal within a communications network, comprising:
- a measuring unit, the measuring unit measuring at least one of active periods of communication between the terminal and the network and silent periods between the active periods;
- an input unit, the input unit setting the terminal in a type of communication mode determined by the measured periods of at least one of the active periods and the silent periods, wherein a session mode of communication is determined for an active period within a first measured time period, a transaction mode of communication is determined for an active period within a second measured time period, and a packet mode of communication is determined for an active period within a third measured time period, further the transaction mode is determined for a silent period which exceeds a first threshold time period and the session mode is determined for a silent period which exceeds a second threshold time period; and
- wherein the input unit sets the terminal and the network in the session mode and adapts a first type location area to the terminal upon initially logging onto the network;
- a memory device, the memory device determining and storing at least one of the position of the terminal in the network, the speed of the terminal in the network and the direction of the terminal in the network; and
- a calculating unit, the calculating unit adapting a second type location area when the terminal and the network are in the session mode and the terminal is located outside the home location area and adapting a third type location area when the determined type of communication mode is at least one of the transaction mode and the packet mode.

52. The system according to claim 51, wherein the second type location area and the third type location area are adapted to the current and recent position of the terminal, the current speed of the terminal, and the direction of movement of the terminal.

* * * * *

UNITED STATES PATENT AND TRADEMARK OFFICE
CERTIFICATE OF CORRECTION

PATENT NO. : 6,466,785 B1
DATED : October 15, 2002
INVENTOR(S) : Georg Chambert et al.

It is certified that error appears in the above-identified patent and that said Letters Patent is hereby corrected as shown below:

Column 2,
Lines 45-46, replace "predetermined: grouping" with -- predetermined grouping --

Column 3,
Line 10, replace "a given. terminal" with -- a given terminal --

Column 8,
Line 54, replace "ti periodically" with -- $t_1$ periodically --

Column 12,
Line 13, replace "$R_GA+B+C$" with -- $R_G=A+B+C$ --

Signed and Sealed this

Twenty-fifth Day of February, 2003

JAMES E. ROGAN
*Director of the United States Patent and Trademark Office*